United States Patent [19]
Aldissi

[11] Patent Number: 5,313,017
[45] Date of Patent: May 17, 1994

[54] HIGH-TEMPERATURE, LIGHT-WEIGHT FILTER LINE CABLE

[75] Inventor: Mahmoud Aldissi, Colchester, Vt.

[73] Assignee: Champlain Cable Corporation, Winooski, Vt.

[21] Appl. No.: 901,632

[22] Filed: Jun. 19, 1992

Related U.S. Application Data

[63] Continuation-in-part of Ser. No. 748,146, Aug. 21, 1991.

[51] Int. Cl.⁵ .......................................... H01B 11/18
[52] U.S. Cl. ........................................ 174/36; 174/34; 174/106 SC
[58] Field of Search ............... 174/36, 34, 102 SC, 174/106 SC, 110 FC; 252/513

[56] References Cited

U.S. PATENT DOCUMENTS

| | | | |
|---|---|---|---|
| 3,191,132 | 6/1965 | Mayer | 174/36 |
| 3,616,177 | 10/1971 | Gumerman | 174/110 FC X |
| 4,347,487 | 8/1982 | Martin | 174/36 X |
| 4,383,225 | 5/1983 | Mayer | 174/36 |
| 4,499,438 | 2/1985 | Cornelius et al. | 174/36 |
| 4,506,235 | 3/1985 | Mayer | 174/36 |
| 4,532,375 | 7/1985 | Weitzel et al. | 174/107 |
| 4,626,810 | 12/1986 | Nixon | 174/110 F X |
| 4,722,758 | 2/1988 | Barrett et al. | 174/110 FC |
| 4,816,614 | 3/1989 | Baigrie et al. | 174/36 |
| 4,969,706 | 11/1990 | Hardin et al. | 174/110 FC |
| 5,047,260 | 9/1991 | Durand | 427/54.1 |
| 5,170,010 | 12/1992 | Aldissi | 174/36 |
| 5,171,937 | 12/1992 | Aldissi | 174/36 |
| 5,206,459 | 4/1993 | Aldissi | 174/36 |

FOREIGN PATENT DOCUMENTS 190939 8/1986 European Pat. Off. .............. 174/36

*Primary Examiner*—Morris H. Nimmo
*Attorney, Agent, or Firm*—Salzman & Levy

[57] ABSTRACT

The present invention features a new "filter line" cable having a temperature-enhancement jacket layer composed of, in various forms, a Teflon layer or fused Teflon/Kapton layers. The filter line cable has a conductive core having a primary insulation layer. Over the primary insulation is a filtering layer made up, at least in part, of ferromagnetic particles (ferrite or magnetite) within a polymeric matrix such as Viton, a fluorinated elastomeric polymer. These ferromagnetic particles may or may not be metal-coated. In addition, they may also be "spherical", to enhance the filtering effect. The filtering layer provides the "filter line" protection against internal RFI and microwave interferences traveling down the wire. The temperature-insulating jacket layering is disposed over the filter layer and is made up of layers of Teflon, Teflon/Kapton, and Teflon/Kapton/Teflon fused together to form an ultra-thin jacket of between 1 to 3 mils, providing high temperature capability in an operative temperature range of approximately between 150° and 260° C.

14 Claims, 3 Drawing Sheets

SILVER-COATED FERROMAGNETIC PARTICLES IN POLYMERIC MATRIX

SILVER-COATED FERROMAGNETIC PARTICLES IN POLYMERIC MATRIX

SILVER-COATED FERROMAGNETIC PARTICLES IN POLYMERIC MATRIX

HIGH-TEMPERATURE, LIGHT-WEIGHT FILTER LINE CABLE

RELATED APPLICATION

This application is a continuation-in-part of copending U.S. patent application, Ser. No. 07/748,146, filed on Aug. 21, 1991. Priority is claimed to common subject matter contained in the parent application, and the teachings expressed therein are hereby incorporated in this application by reference.

FIELD OF THE INVENTION

The invention relates to a "filter line" cable featuring a high-temperature jacket layer for providing the filter line layer with high temperature capabilities, and, more particularly, to a "filter line" cable construction which features metal-coated particles of ferrite or magnetite dispersed within a polymeric matrix of the filter line layer, which is overlaid with a high-temperature, light-weight jacket.

BACKGROUND OF THE INVENTION

Wire providing microwave/radar frequency attenuation is referred to in the wire and cable trade as "filter line". Some of these cables are referenced by U.S. Mil. Spec. No. Mil-C-85485. The measurement of the attenuation (insertion loss) upon a given wire's performance relates to the effect that the filter line has upon the interference signals which are conducted down the wire.

The ever-increasing high technology requirements of the aerospace industry demand that filter line cables be smaller in size, more flexible, and lighter in weight, while also providing high temperature capabilities. Utilizing the commercial materials that are presently available, some of the latest industry requirements cannot even be met.

This invention seeks to provide new, space-age materials in unique combinations to provide EMI, microwave and radar filtering capabilities in a wider frequency range than heretofore available. At the same time, the invention provides a cable product that utilizes a thinner filtering layer, which reduces the size of the composite cable construction. In addition, the newer materials are lighter; their thinner cross-sections further reduce the weight of the finished cable product. Another advantage of the thinner filtering layer is the increased flexibility of the cable. The high-temperature jacket is also of very thin construction, thus affording high temperature capability without sacrificing the size, weight, and flexibility advantages provided by the thinner inner cable layers.

Recently, ferromagnetic particles of ferrite or magnetite have been coated with metal in order to provide conductive materials having advantageous electrical and magnetic properties. It is contemplated with this invention that these types of materials can be loaded into a polymeric matrix for use as an interference layer in the fabrication of "filter line" cable.

The current invention reflects the discovery that, when ferrites are mixed with certain polymers, they provide easily extrudable compounds that are most suitable for wire and cable fabrication. Such compounds can be directly extruded over bare or insulated wire to form a wire and cable article that attenuates (filters) high frequency interferences down the cable line.

The filter line cable of this invention has been reduced in size. The various layers in the construction have been made exceptionally thin. As a result, the cable is also enhanced by a high-temperature jacket layer. The addition of a thinly overlaid jacket layer provides high temperature capabilities, without sacrificing the advantages provided by the lighter, thinner and more flexible inner layers of the cable construction. This jacket layer comprises a layer or layers of polytetrafluoroethylene; polytetrafluoroethylene and polyimide; or polytetrafluoroethylene, polyimide and polytetrafluoroethylene fused together. Such a configuration will increase the temperature rating of the overall cable up to 260° C., which is a substantial increase over standard "filter line", which has a typical temperature rating of 150° C.

The present invention seeks to fabricate wire and cable articles that provide protection against both of the aforementioned effects, namely, attenuation of signals conducted down the wire and high-temperature effects.

The current invention contemplates a wire or cable construction using a layer composed (at least in part) of silver-coated magnetic particles such as ferrites or magnetites dispersed in a polymeric matrix, such as Viton (a fluorinated elastomeric polymer manufactured by Du Pont). The magnetic particles are provided by various manufacturers, including Steward Manufacturing Company of Tennessee and Fair-Rite Products Corporation of New York. The impedance characteristics of the magnetic particles vary, depending upon the supplier, fabrication conditions and composition. Metal coating (such as silver) is provided by Potters Industries, Inc., of Parsippany, N.J.

High-frequency signals conducted down this wire are partially absorbed by the silver-coated particle shield layer. The electromagnetic waves penetrate through the jacket layer to the filter layer and are partially absorbed by the ferrite particles. They are then dissipated by lattice vibration or phonon emission.

The advantages of the cable construction of this invention include a savings in cost, a streamlined economy of size and weight, and an improved flexibility, while also improving the operative frequency range and temperature capabilities of the cable.

SUMMARY OF THE INVENTION

In accordance with the present invention, there is provided a new "filter line" cable having a temperature-enhancement jacket layer comprising, in various embodiments, a layer of polytetrafluoroethylene (Teflon) or fused layers of polytetrafluoroethylene (Teflon) and polyimide (Kapton). The filter line cable comprises a conductive core having a primary insulation layer. Over the primary insulation is a filtering layer made up, at least in part, of metal-coated ferromagnetic particles of ferrite or magnetite dispersed within a polymeric matrix such as Viton, a fluorinated elastomeric polymer. The filtering layer provides the "filter line" protection against internal RFI and microwave interferences traveling down the wire. The temperature-insulating jacket layering is disposed over the filter layer and is itself composed of layers of polytetrafluoroethylene, polytetrafluroethylene/polyimide and polytetrafluoroethylene/polyimide/polytetrafluoroethylene fused together to form an ultra-thin jacket of between 1 to 3 mils, providing high temperature capability in an approximate temperature range of between 150° and 260° C.

The ultra-thin cable containing the new filtering layer has extended operational frequency ranges against EMI, microwave and RFI interferences. The thin composite layers provide a cable featuring improvements in size, weight, flexibility and cost. Such improvements are in keeping with stringent, rigorous aerospace industry requirements.

The mixture compound of particulates and polymer binder can be prepared by state-of-the-art compounding techniques and then molded or extruded to provide the filtering layer, as taught in the aforementioned patent application. The magnetic particles can be metal-coated by processes such as that described in European Patent Application, Publication No. 0 354 131 A2, by C. F. Schneider et al, entitled "Ferrite Particle Plating System and Electromagnetic Shielding", published Feb. 7, 1990.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Generally speaking, the invention features, in combination, new types of filtering and shielding materials. These materials are particularly useful in the fabrication of shielded "filter line" wire and cable articles having extended operational frequency ranges. The "filter line" materials can be made, in part, of metal-coated ferromagnetic particles comprising magnetite and/or ferrite particles dispersed within a binding polymer or a combination of binding polymers. The filtering materials can be layered, extruded, coated, wrapped, etc., over an insulated conductive core. The metal-coated particles are fabricated by techniques such as electrodeposition, vacuum deposition and other well-known methods (e.g., as described in the aforementioned European Patent Application, Publication No. 0 354 131 A2). These ferromagnetic particles can also be blended with other materials by state-of-the-art techniques. Other metal particles (such as particles of copper, silver, nickel, manganese, zinc, or silver-coated copper in combination with metal-coated ferrites and magnetites) dispersed within the polymer matrix may also be part of the blend formulation.

Figure 1:
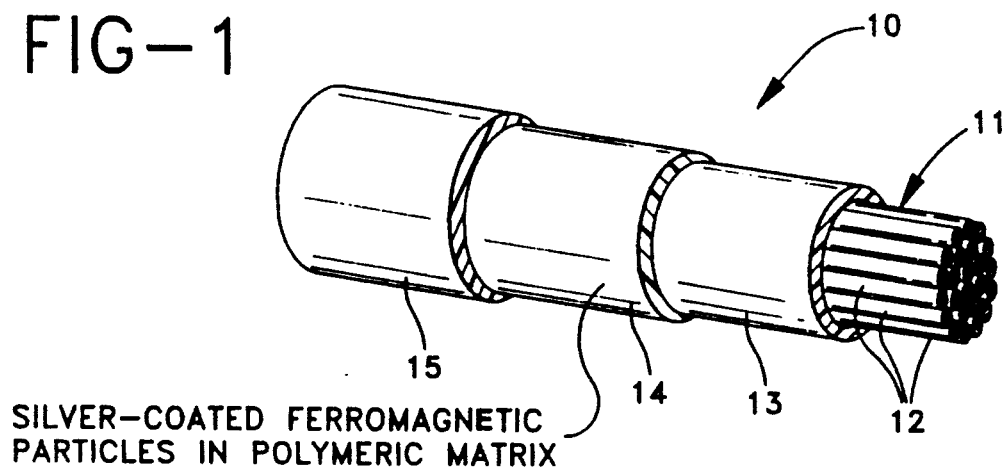
FIG. 1 illustrates a partially cut-away, perspective view of a typical, shielded "filter line" cable article, fabricated in accordance with the filtering and shield layer materials of the present invention.

Now referring to FIG. 1, a cable 10 of this invention is shown in partial cut-away perspective view. The cable 10 comprises a conductive core member 11, which contains one or more electrically conductive wires 12 of approximately 40 mils in diameter. The wires 12 can be straight-bundled or twisted together.

The conductive wires 12 in a preferred embodiment are stranded wires of AWG 20 tin-coated copper. The wires 12 are covered by a layer of primary insulation 13 comprising polyvinylidenefluoride (Kynar) or some other fluorinated polymer or polymers of approximately 2 mils thickness.

A filter layer 14 of approximately 4 mils thickness is disposed over the primary insulation layer 13. The filter layer comprises, in part or in entirety, silver-coated ferromagnetic particles dispersed within and throughout a polymeric matrix of Viton, a rubberized elastomer manufactured by E. I. Du Pont de Nemours, Inc.

The ferromagnetic particles can be either ferrites, magnetites or a blend thereof. The filter layer 14 provides "filter line" function in an extended range. The matrix comprises approximately 10 to 90% by weight of the blend of materials. The metal coating on the particles can range from approximately 5% to 95% of the entire particle weight.

Disposed over the filter layer 14 is a jacket 15, ranging from 1.5 to approximately 5 mils in thickness. The jacket layer 15 can comprise a fluorinated polymer tape, such as Teflon. The jacket layer 15 can be applied as a wrap of tape.

Figure 2:
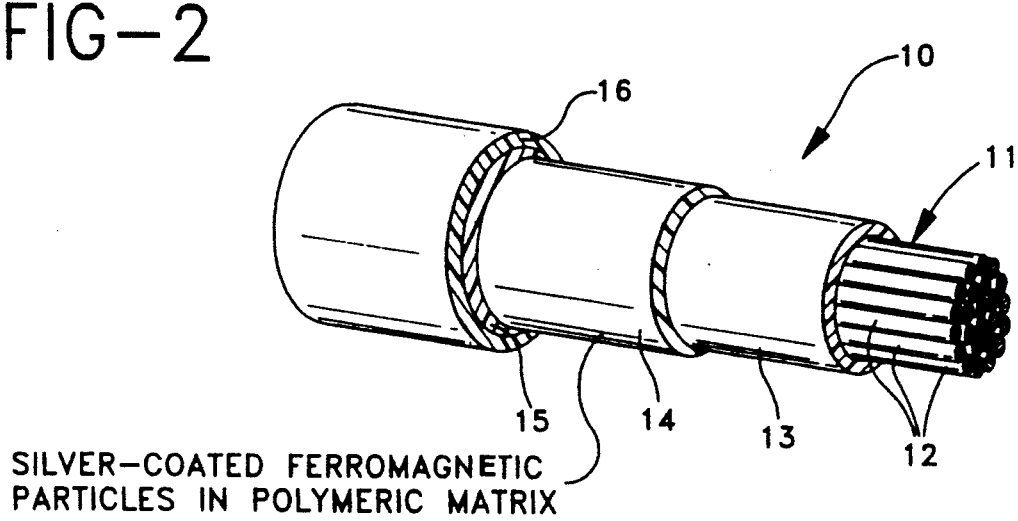
FIG. 2 depicts a first alternate embodiment of the "filter line" cable shown in FIG. 1, wherein the outermost jacket layer comprises a two-layer composite.

Now referring to FIG. 2, a first alternate embodiment of the cable 10 of FIG. 1 is illustrated. The jacket layer 15 can comprise a composite of two fused layers, 16 and 17, of polytetrafluoroethylene (Teflon) and polyimide (Kapton); this composite is wrapped over the filter layer 14.

Figure 3:
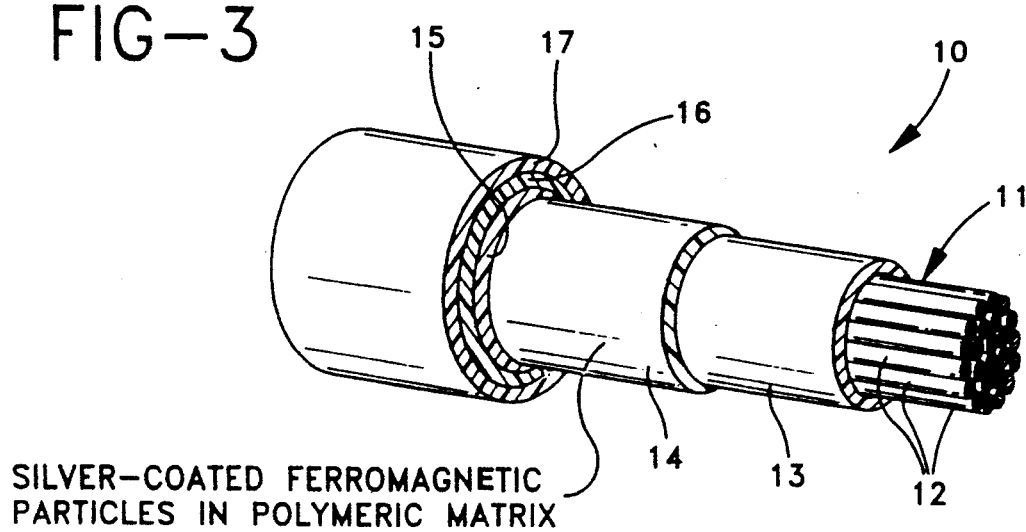
FIG. 3 shows a second alternate embodiment of the "filter line" cable shown in FIG. 1, wherein the outermost jacket layer comprises a three-layer composite.

Now referring to FIG. 3, a second alternate embodiment of the cable 10 of FIG. 1 is illustrated. The jacket layer 15 comprises a composite of three fused layers 16, 17 and 18 comprising Teflon, Kapton and Teflon; this composite is wrapped over the filter layer 14.

Figure 4A:
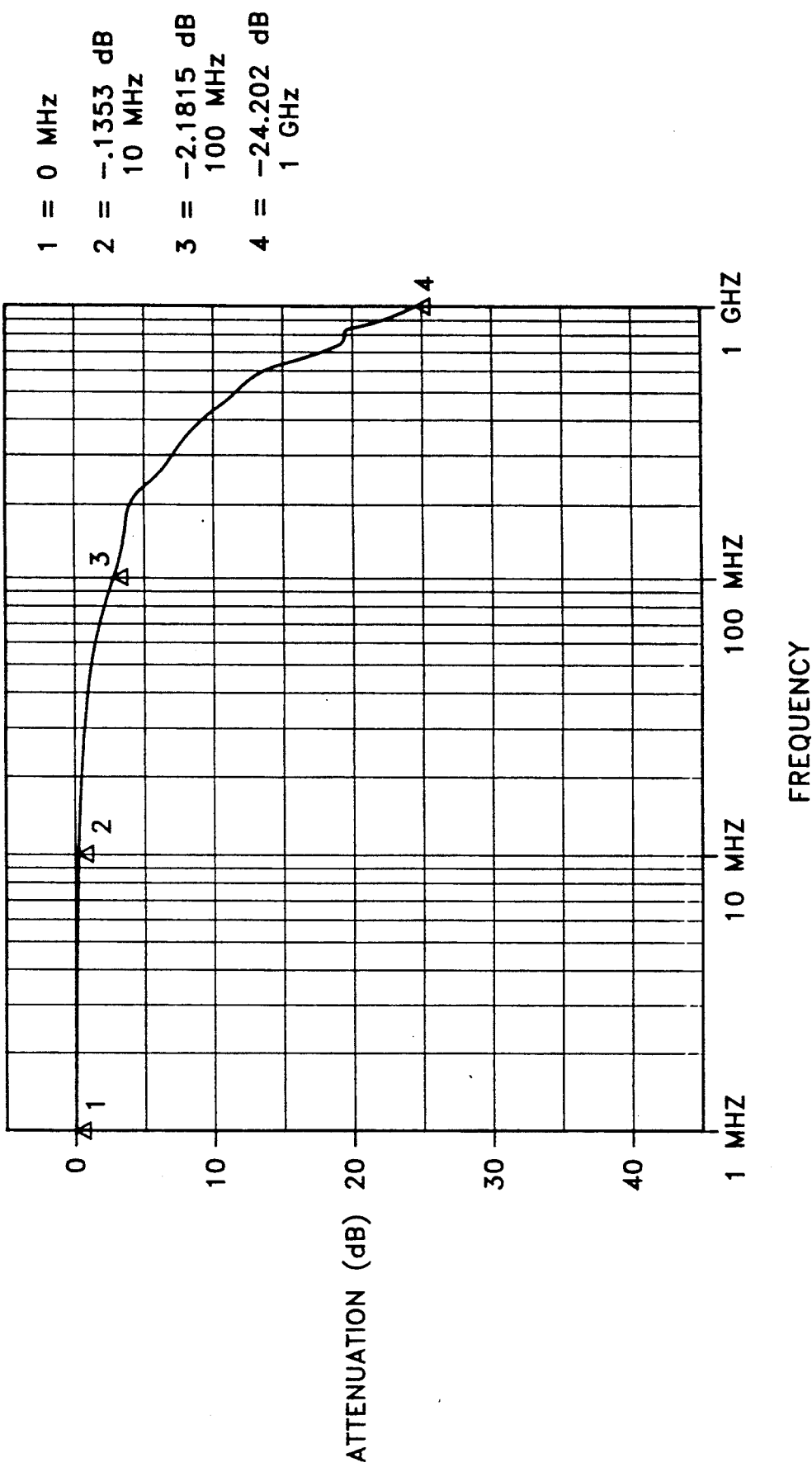
FIGS. 4a and 4b depict graphics of the attenuation provided by the cable construction, as illustrated in FIG. 2.
Figure 4B:
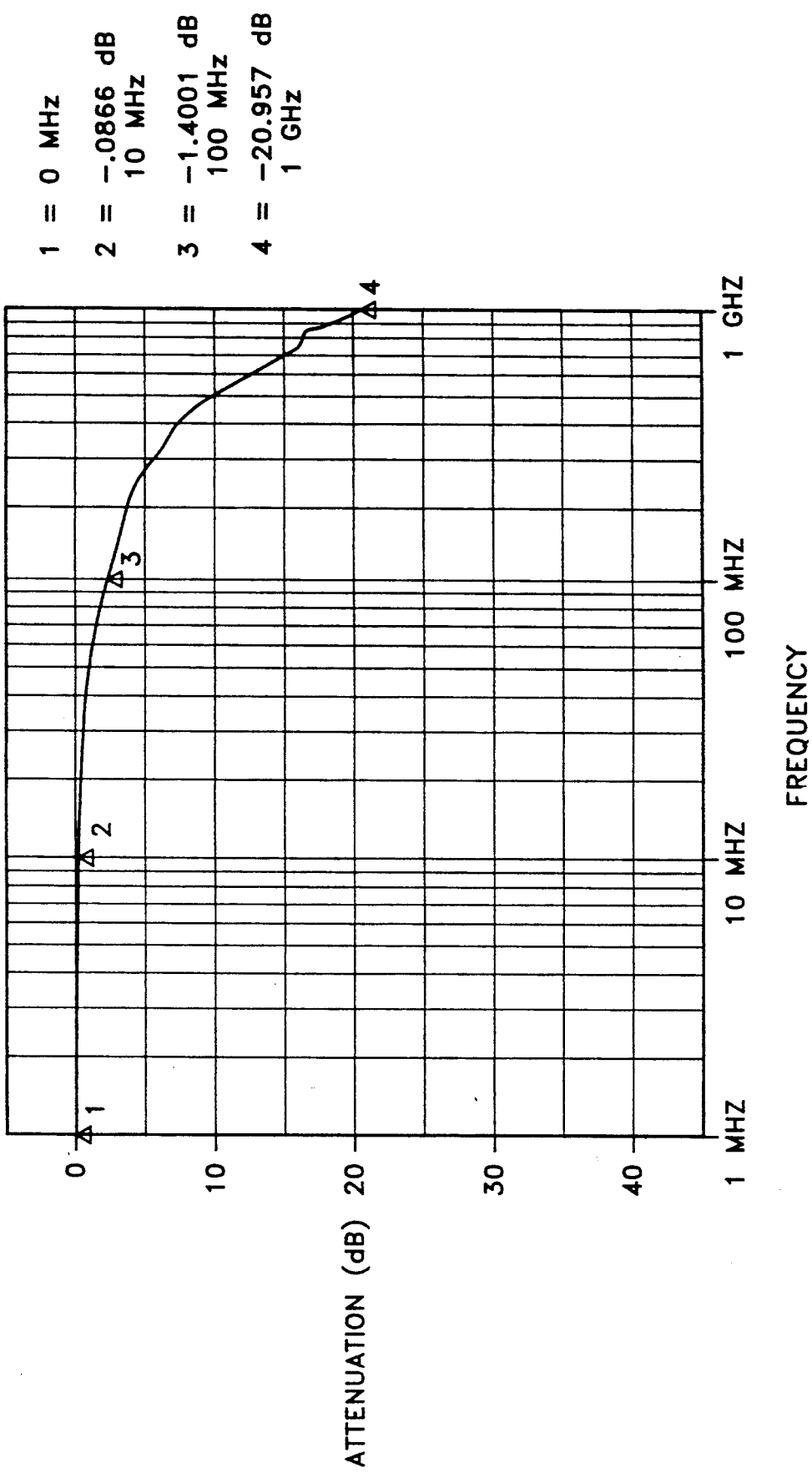

Referring to FIGS. 4a and 4b, graphical illustrations are presented of the attenuation provided by the cable 10 embodiment described in the abovementioned FIG. 2. The improvement in attenuation over standard filter line cable of ordinary thickness is presented by the data in Table I below; this data is derived from the graphical illustrations depicted in FIGS. 4a and 4b.

TABLE I

| CABLE CONSTRUCTION | FREQUENCIES | | | |
|---|---|---|---|---|
| | 10 MHz | 100 MHz | 500 MHz | 1 GHz |
| | (attenuation in dB/ft.) | | | |
| Mil-C-85485 (5 mil jacket) | 0.12 | 2.38 | 10 | 41 |
| Invention - jacket of | | | | |
| Teflon/Kapton - 2.6 mil | 0.17 | 2.80 | 19.8 | 42 |
| Teflon tape - 1.3 mil | 0.27 | 4.36 | 16.0 | 48.4 |

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described this invention, what is desired to be protected by LETTERS PATENT is presented by the subsequently appended claims.

What is claimed is:

1. A filter line cable having high temperature capability in an approximate temperature range of between 150° and 260° C., comprising:

a conductive core;

a primary insulation layer disposed over said conductive core;

a filter layer disposed over said primary insulation layer including ferromagnetic particles disposed in a polymer matrix, said filter layer providing enhanced operational frequency range;

a high-temperature jacket of at least one layer of a fluorinated polymer, including polyimide and polytetrafluoroethylene, disposed over said filter layer in an approximate thickness range of between 1 to 3 mils, and providing an operative upper temperature range of approximately between 150° and 260° C.

2. The filter line cable of claim 1, wherein said ferromagnetic particles further comprise particles selected from a group of materials consisting of metal-coated ferrite, metal-coated magnetite and combinations thereof.

3. The filter line cable of claim 1, wherein said ferromagnetic particles are coated with a metal selected from a group consisting of silver, nickel, copper, zinc and manganese.

4. The filter line cable of claim 3, wherein at least some of said metal-coated ferromagnetic particles are substantially spherical.

5. The filter line cable of claim 1, wherein said polymeric matrix comprises a fluorinated elastomer.

6. The filter line cable of claim 1, wherein said jacket layer comprises a conductive fluorinated polymer tape.

7. The filter line cable of claim 1, wherein said jacket comprises at least one layer of material selected from a group of materials consisting of polytetrafluoroethylene, polytetrafluoroethylene fused with polyimide, and a fused layer of polytetrafluoroethylene/polyimide/polytetrafluoroethylene.

8. The filter line cable of claim 1, wherein said jacket comprises three fused layers comprising polytetrafluoroethylene/polyimide/polytetrafluoroethylene.

9. A filter line cable having high temperature capability in an approximate temperature range of between 150° and 260° C., comprising:

a conductive core;

a primary insulation layer disposed over said conductive core;

a filter layer disposed over said primary insulation layer including ferromagnetic particles, at least some of which are metal-coated spherical particles, said ferromagnetic particles being disposed in a polymer matrix, said filter layer providing enhanced operational frequency range;

a high-temperature jacket of at least one layer of a conductive fluorinated polymer tape disposed over said filter layer in an approximate thickness range of between 1 to 3 mils, and providing an operative upper temperature range of approximately between 150° and 260° C.

10. The filter line cable of claim 9, wherein said ferromagnetic particles are coated with a metal selected from a group consisting of silver, nickel, copper, zinc and manganese.

11. The filter line cable of claim 9, wherein said polymeric matrix comprises a fluorinated elastomer.

12. The filter line cable of claim 9, wherein said jacket comprises at least one layer of material selected from a group of materials consisting of polytetrafluoroethylene, polytetrafluoroethylene fused with polyimide, and a fused layer of polytetrafluoroethylene/polyimide/polytetrafluoroethylene.

13. The filter line cable of claim 9, wherein said jacket comprises two fused layers comprising polytetrafluoroethylene and polyimide.

14. The filter line cable of claim 9, wherein said jacket comprises three fused layers comprising polytetrafluoroethylene/polyimide/polytetrafluoroethylene.

* * * * *